(12) United States Patent
Lyle

(10) Patent No.: US 8,170,872 B2
(45) Date of Patent: May 1, 2012

(54) INCORPORATING USER EMOTION IN A CHAT TRANSCRIPT

(75) Inventor: Ruthie D. Lyle, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 634 days.

(21) Appl. No.: 11/950,068

(22) Filed: Dec. 4, 2007

(65) Prior Publication Data

US 2009/0144366 A1 Jun. 4, 2009

(51) Int. Cl.
*G10L 15/00* (2006.01)
(52) U.S. Cl. ............ 704/235; 704/260; 379/88.17; 379/88.18
(58) Field of Classification Search .......... 704/235, 704/260; 379/88.17, 88.18
See application file for complete search history.

(56) References Cited

U.S. PATENT DOCUMENTS

| | | | |
|---|---|---|---|
| 6,876,728 B2 | 4/2005 | Kredo et al. | |
| 6,963,839 B1 | 11/2005 | Ostermann et al. | |
| 7,103,548 B2 | 9/2006 | Squibbs et al. | |
| 7,451,188 B2* | 11/2008 | Cheung et al. | 709/206 |
| 7,640,304 B1* | 12/2009 | Goldscheider | 709/205 |
| 2002/0005865 A1* | 1/2002 | Hayes-Roth | 345/706 |
| 2003/0002633 A1* | 1/2003 | Kredo et al. | 379/88.08 |
| 2003/0187650 A1* | 10/2003 | Moore et al. | 704/260 |
| 2004/0186721 A1* | 9/2004 | Beynon et al. | 704/270 |
| 2007/0208569 A1* | 9/2007 | Subramanian et al. | 704/270 |

\* cited by examiner

*Primary Examiner* — Daniel D Abebe
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to chat transcript generation for instant messaging and provide a method, system and computer program product for emotional state transcription for chat sessions. In an embodiment of the invention, a method for emotional state transcription for chat sessions can be provided. The method can include initializing a chat session in an instant messenger, engaging in an audio conversation through the instant messenger, collecting emotion meta-data for the audio conversation and mapping the emotion meta-data to emoticons, and combining a speech recognized form of the audio conversation with the emoticons and text from the chat session into a chat transcript. The method further can include computing a milleau for the chat session from the emotion meta-data and incorporating the milleau for the chat session in the transcript.

7 Claims, 1 Drawing Sheet

INCORPORATING USER EMOTION IN A CHAT TRANSCRIPT

BACKGROUND OF THE INVENTION

1. Field of the Invention

The present invention relates to the field of instant messaging and more particularly to chat session transcription for chat sessions.

2. Description of the Related Art

Instant messaging as a technology provides the backbone of real time communications amongst collaborators. Though the notion of real time communications harkens back before the days of the World Wide Web to a citizens band radio analog for computer communications, instant messaging as a technology only has begun to come into its own in the past several years. Originally, instant messaging was limited only to the basic exchange of text messages within a dashboard display of messages. As the technology has matured, though, additional functionality has been added including the integration of voice and video into chat sessions and also the use of emotional icons (emoticons) to visually express the emotions experienced by a chat session participant.

Emoticons are well known in the world of electronic communications and have found use not only in instant messaging, but also in asynchronous modes of communication like e-mail. So popular have emoticons become, that people have been known to hand write emoticons outside of the computer communications modality in order to express emotion pictorially in writing without resort to a textual description of emotion. From the human factors perspective, however, emoticons are a rudimentary mechanism to communicate one's feeling during a remote conversation despite the inability of participants to the conversation to "hear" and "see" one another.

Integral to the instant messaging experience is the notion of a chat transcript. While instant messaging aims to provide an adequate substitute for human-to-human conversation, instant messaging in many ways is a superior mode of communication in that unlike interpersonal conversations, in the instant messaging world, a chat session can be secured and a chat session can be recorded for future reference. In the latter circumstance, end users can choose to persist a transcript of a contemporaneous conversation on a case by case basis, or end users can choose simply to record all chat sessions into a transcript for future reference.

When recording a chat transcript, the emotional state of participants to the chat session can be recorded only to the extent that emoticons are provided by the different participants. However, emoticons as provided by participants are only subjective views of the actual emotional dependent exclusively on the judgment of the participant providing the emoticon. Further, to the extent that audio has been included as part of the chat session, the nature of the audio conversation will be lost along with the emotional state of the participants to the audio conversation apparent from the voice of the participants.

BRIEF SUMMARY OF THE INVENTION

Embodiments of the present invention address deficiencies of the art in respect to chat transcript generation for instant messaging and provide a novel and non-obvious method, system and computer program product for emotional state transcription for chat sessions. In an embodiment of the invention, a method for emotional state transcription for chat sessions can be provided. The method can include initializing a chat session in an instant messenger, engaging in an audio conversation through the instant messenger, collecting emotion meta-data for the audio conversation and mapping the emotion meta-data to emoticons, and combining a speech recognized form of the audio conversation with the emoticons and text from the chat session into a chat transcript. The method further can include computing a milieu for the chat session from the emotion meta-data and incorporating the milieu for the chat session in the transcript.

In another embodiment of the invention, an instant messaging data processing system can be provided. The system can include a chat server coupled to an instant messaging client over a computer communications network. The instant messaging client can be coupled to a speech recognition engine and a biometric emotion detection apparatus. The system further can include emotion integration logic coupled to the instant messaging client. The logic can include program code enabled to collect emotion meta-data from the biometric emotion detection apparatus for an audio conversation arising from a chat session managed by the chat server, to map the emotion meta-data to emotional icons (emoticons), and to combine a text form of the audio conversation produced by the speech recognition engine with the emoticons and text from the chat session into a chat transcript.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for emotional state transcription for chat sessions. In accordance with an embodiment of the present invention, a chat session can be established amongst participants to the chat session and audio can be exchanged between the participants within the chat session. An emotional state can be determined from the audio for each of the participants and the emotional state can be mapped to an emoticon. Thereafter, a textual transcript of the audio can be merged with a chat transcript for the chat session and the emoticons can be placed in a portion of the textual transcript giving rise to the emotional state. In this way, the emotional state of the participants can be recorded into the chat session despite the use of audio within the chat session.

Figure 1:
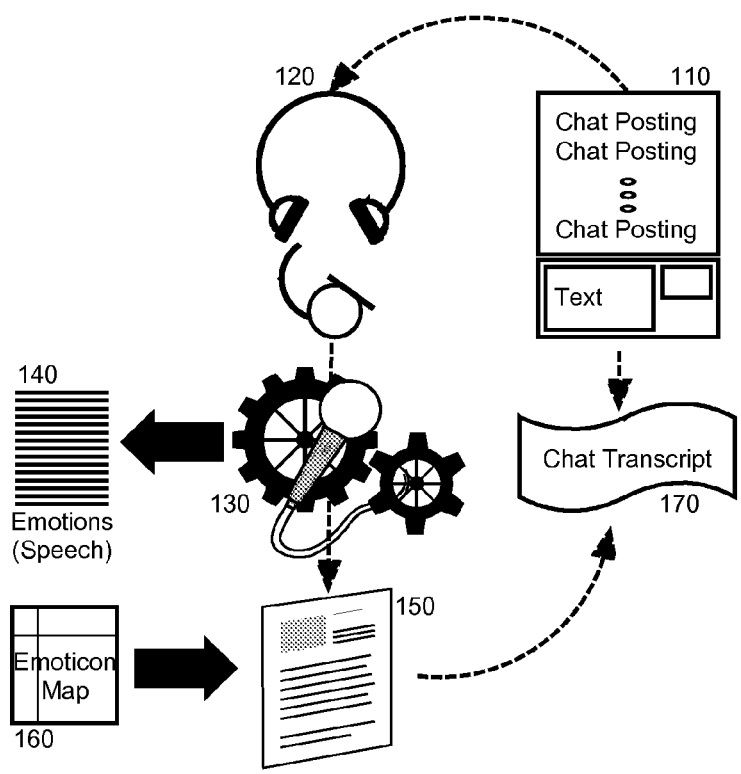
FIG. 1 is a pictorial illustration of a process for emotional state transcription for chat sessions.

In further illustration, FIG. 1 is a pictorial illustration of a process for emotional state transcription for chat sessions. As shown in FIG. 1, a chat session 110 of textual postings can be managed in connection with an audio chat portion 120. The audio chat portion 120 can subjected to biometric emotion detection 130 to produce emotional meta-data 140 for a participant in the audio chat portion 120 corresponding to an emotional state of the participant. Thereafter, the audio chat portion 120 can be converted to an audio transcript 150 via speech recognition. The emotional meta-data 140 can be mapped to emoticons via emoticons mapping 160 and the emoticons can be emplaced into the audio transcript 150 at relevant portions. Optionally, the emotional meta-data 140 can be viewed for an entirety of the audio portion and mapped to an indication of a general milieu for the audio portion as opposed to a section of audio in the audio portion. Finally, the audio chat portion 120 with emplaced emoticons can be merged with the chat transcript 170, for instance in chronological order of utterances and postings to accurately reflect a chronology of the underlying conversation.

Figure 2:
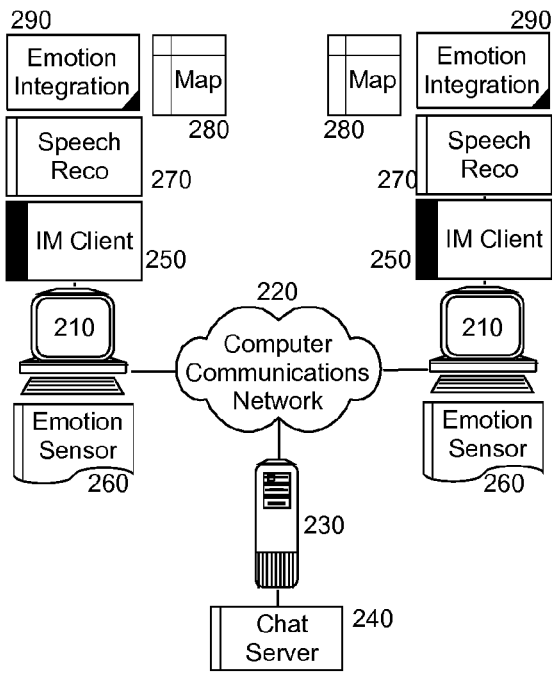
FIG. 2 is a schematic illustration of an instant messaging data processing system configured for emotional state transcription for chat sessions; and, FIG. 3 is a flow chart illustrating a process for emotional state transcription for chat sessions.

The process shown in FIG. 1 can be implemented in an instant messaging data processing system. In illustration, FIG. 2 schematically depicts an instant messaging data processing system configured for emotional state transcription for chat sessions. The system can include a host server 230 configured for communicative coupling to multiple different client computing devices 210 over computer communications network 220. The host server 230 can support the operation of a chat server 240 managing chat sessions between different instant messaging clients 250, each executing in a different one of the client computing devices 210.

The chat session managed by the chat server 240 can support the exchange of voice over Internet protocol (IP) audio from within the chat session. Additionally, the chat session managed by the chat server 240 can support the persistence of a transcript for the chat session. Notably, speech recognition engine 270 can be coupled to each of the instant messaging clients 250 in order to generate a text transcript of audio portions of the chat session to be merged into the chat transcript. Yet further, emotion integration logic 290 can be provided for each of the instant messaging clients 250 in order to augment the chat transcript with an indication of emotion for the audio portions of the chat session.

Figure 3:
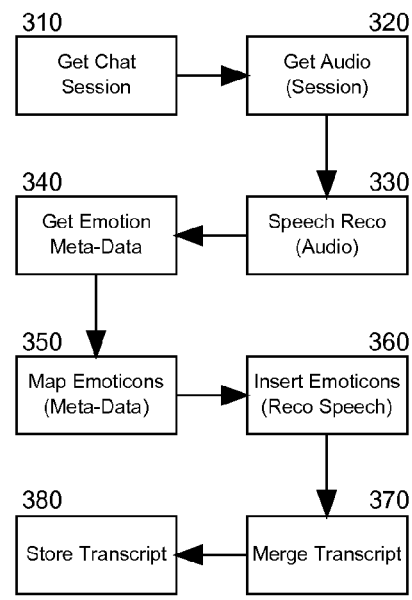

Specifically, the emotion integration logic 290 can be coupled to a biometric emotion detection apparatus (not shown) in order to extract meta-data for contemporaneously provided audio during an audio portion of the chat session. Biometric emotion detection is well known in the art and has been specifically tailored for automatic speech recognition applications within call centers in recent years. The program code of the emotion integration logic 290 can be enabled to lookup emotion meta-data provided by the biometric emotion detection apparatus (not shown) in emoticon mapping 280 in order to identify emoticons representative of an emotional state for the contemporaneously provided audio during the audio portion of the chat session. The program code of the emotion integration logic 290 in turn can be enabled to insert the emoticons at appropriate positions in the audio transcript for merger into the chat transcript for the chat session. Optionally, the chat transcript can be formatted according to the hypertext markup language (HTML) to support rich text formatting In further illustration, FIG. 3 is a flow chart illustrating a process for emotional state transcription for chat sessions. The process can begin in block 310 with the selection of a chat session and in block 320 with the conduct of an audio portion of the chat session. During the conduct of the audio portion, biometric emotion meta-data can be obtained for the emotional state of the conversant providing the audio. In block 330, the audio portion can be speech recognized to produce a textual version of the audio portion and in block 340, the emotion meta-data for each conversant for the audio portion can be retrieved. Thereafter, in block 350 the emotion meta-data can be mapped to emoticons and placed within the textual version of the audio portion in block 360. In block 370, the textual version with emoticons can be merged with a textual transcript for the chat and in block 380 the transcript can be stored.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for emotional state transcription for chat sessions comprising:

initializing a chat session in an instant messenger executing in memory by a processor of a computer;

engaging in an audio conversation through the instant messenger;

collecting emotion meta-data for the audio conversation and mapping the emotion meta-data to emotional icons (emoticons); and, combining a speech recognized from of the audio conversation with the emoticons and text from the chat session into a chat transcript.

2. The method of claim 1, further comprising:
computing a milieu for the chat session from the emotion meta-data; and,
incorporating the milieu for the chat session in the transcript.

3. The method of claim 1, wherein combining a speech recognized from of the audio conversation with the emoticons and text from the chat session into a chat transcript, comprises:
inserting each emoticon in association with a portion of the speech recognized form of the audio conversation in response to which mapped emotion meta-data had been collected; and,
merging the speech recognized form of the audio conversation with inserted emoticons chronologically with the text for the chat session to produce the chat transcript.

4. An instant messaging data processing system comprising:
a chat server with at least one processor and memory coupled to an instant messaging client over a computer communications network, the instant messaging client being coupled to a speech recognition engine and a biometric emotion detection apparatus; and,
emotion integration logic coupled to the instant messaging client, the logic comprising program code enabled to collect emotion meta-data from the biometeric emotion detection apparatus for an audio conversation arising from a chat session managed by the chat server, to map the emotion meta-data to emotional icons (emoticons), and to combine a text form of the audio conversation produced by the speech recognition engine with the emoticons and text from the chat session into a chat transcript.

5. A computer program product comprising a non-transitory computer usable storage medium embodying computer usable program code for emotional state transcription for chat sessions, the computer program product comprising:
computer usable program code for initializing a chat session in an instant messenger;
computer usable program code for engaging in an audio conversation through the instant messenger;
computer usable program code for collecting emotion meta-data for the audio conversation and mapping the emotion meta-data to emotional icons (emoticons); and,
computer usable program code for combining a speech recognized form of the audio conversation with the emoticons and text from the chat session into a chat transcript.

6. The computer program product of claim 5, further comprising:
computer usable program code for computing a milieu for the chat session from the emotion meta-data; and,
computer usable program code for incorporating the milieu for the chat session in the transcript.

7. The computer program product of claim 5, wherein the computer usable program code for combining a speech recognized form of the audio conversation with the emoticons and text from the chat session into a chat transcript, comprises:
computer usable program code for inserting each emoticon in association with a portion of the speech recognized form of the audio conversation in response to which mapped emotion meta-data had been collected; and,
computer usable program code for merging the speech recognized form of the audio conversation with inserted emoticons chronologically with the text for the chat session to produce the chat transcript.

* * * * *